US009247086B2

(12) United States Patent
Fujiwara (10) Patent No.: US 9,247,086 B2
(45) Date of Patent: Jan. 26, 2016

(54) DOCUMENT READER

(71) Applicant: Brother Kogyo Kabushiki Kaisha, Nagoya-shi, Aichi-ken (JP)

(72) Inventor: Takashi Fujiwara, Aichi-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/493,667

(22) Filed: Sep. 23, 2014

(65) Prior Publication Data

US 2015/0015927 A1 Jan. 15, 2015

Related U.S. Application Data

(63) Continuation of application No. 13/756,739, filed on Feb. 1, 2013, now Pat. No. 8,867,111.

(30) Foreign Application Priority Data

Feb. 3, 2012 (JP) ................................. 2012-021427

(51) Int. Cl.
*H04N 1/04* (2006.01)
*H04N 1/00* (2006.01)

(52) U.S. Cl.
CPC ......... *H04N 1/00543* (2013.01); *H04N 1/0062* (2013.01); *H04N 1/0066* (2013.01); *H04N 1/00588* (2013.01); *H04N 1/00591* (2013.01);
(Continued)

(58) Field of Classification Search
CPC ............ H04N 1/00543; H04N 1/0062; H04N 1/00588; H04N 1/00591; H04N 1/00615; H04N 1/00631

USPC ......... 358/498, 496, 296, 401, 400, 471, 474, 358/501, 505; 399/367, 18, 21
See application file for complete search history.

(56) References Cited

U.S. PATENT DOCUMENTS 6,581,923 B2 * 6/2003 Takamatsu ..................... 271/3.2
7,202,983 B2   4/2007 Yokota et al.
(Continued)

FOREIGN PATENT DOCUMENTS

CN     102107788 A    6/2011
CN     102137214 A    7/2011
(Continued)

OTHER PUBLICATIONS

Jan. 6, 2015—(JP) Notification of Reasons for Rejection—App 2012-021427, Eng Tran.
(Continued)

*Primary Examiner* — Cheukfan Lee
(74) *Attorney, Agent, or Firm* — Banner & Witcoff, Ltd.

(57) ABSTRACT

A document reader is provided that includes a document table at least part of which is configured to swing around a first axis, between a first position to function as the document table and a second position to be more slanted with respect to a first guide than when in the first position, a swing portion configured to form a part of a feeding surface forming a second guide and configured to swing around a second axis, between a third position to function as the second guide and a fourth position to expose a part of a feeding path that is formed by the second guide to the outside of the document reader, and a switching mechanism for swinging the swing portion from the third position to the fourth position with the swing motion of the at least part of the document table.

5 Claims, 9 Drawing Sheets (52) U.S. Cl.
CPC ....... *H04N 1/00615* (2013.01); *H04N 1/00631* (2013.01); *H04N 1/00633* (2013.01); *H04N 2201/0081* (2013.01)

(56) References Cited

U.S. PATENT DOCUMENTS

| | | | |
|---|---|---|---|
| 7,379,700 | B2 | 5/2008 | Iwata |
| 7,512,374 | B2 | 3/2009 | Ono et al. |
| 7,623,276 | B2 | 11/2009 | Hiraoka et al. |
| 7,637,497 | B2 | 12/2009 | Kusama |
| 8,416,476 | B2 | 4/2013 | Tamehira et al. |
| 8,419,006 | B2 | 4/2013 | Imura |
| 8,467,113 | B2 | 6/2013 | Tsujimura |
| 8,531,741 | B2 | 9/2013 | Takeuchi et al. |
| 8,570,624 | B2 | 10/2013 | Nagashima |
| 8,587,848 | B2 | 11/2013 | Nose et al. |
| 8,605,342 | B2 | 12/2013 | Akimatsu |
| 8,610,974 | B2 | 12/2013 | Takeuchi et al. |
| 2005/0127598 | A1 | 6/2005 | Nagura |
| 2006/0082842 | A1 | 4/2006 | Hiraoka et al. |
| 2006/0291929 | A1 | 12/2006 | Ono et al. |
| 2009/0218748 | A1 | 9/2009 | Kusama |
| 2011/0176188 | A1 | 7/2011 | Tamehira et al. |
| 2011/0188101 | A1 | 8/2011 | Tsujimura |
| 2011/0242624 | A1* | 10/2011 | Takeuchi ........... H04N 1/00546 358/498 |
| 2011/0242626 | A1 | 10/2011 | Nagashima |
| 2012/0155941 | A1* | 6/2012 | Kozaki ............... H04N 1/00525 399/367 |
| 2014/0312555 | A1 | 10/2014 | Samoto et al. |
| 2015/0092255 | A1* | 4/2015 | Sakakibara ........ H04N 1/00559 358/498 |

FOREIGN PATENT DOCUMENTS

| | | |
|---|---|---|
| CN | 102170509 A | 8/2011 |
| CN | 102209166 A | 10/2011 |
| JP | 2002-274694 A | 9/2002 |
| JP | 2002274694 A * | 9/2002 |
| JP | 2004-099240 A | 4/2004 |
| JP | 3640955 B2 | 4/2005 |
| JP | 2005-170637 A | 6/2005 |
| JP | 3660859 B2 | 6/2005 |
| JP | 4095054 B2 | 6/2008 |
| JP | 2009-227440 A | 10/2009 |
| JP | 2011-225327 A | 11/2011 |

OTHER PUBLICATIONS

Dec. 24, 2014—(CN) The First Office Action—App 201310041958.0, Eng Tran.

Jun. 16, 2015—(CN) The Second Office Action—App 201310041958.0, Eng Tran.

* cited by examiner

DOCUMENT READER

CROSS-REFERENCE TO RELATED APPLICATION

This application is a continuation of prior U.S. application Ser. No. 13/756,739, Feb. 1, 2013, which claims priority under 35 U.S.C. §119 from Japanese Patent Application No. 2012-021427 filed on Feb. 3, 2012. The entire subject matter of the application is incorporated herein by reference.

BACKGROUND

1. Technical Field

The following description relates to one or more document readers.

2. Related Art

A document reader has been known that includes a document table configured to hold document sheets to be read, and a discharge table that is disposed below the document table with an overlap with the document table in the vertical direction and is configured to receive ejected document sheets. The known document reader further includes a conveyor configured to convey the document sheets held on the document table on a sheet-by-sheet basis along a feeding path (a conveyance guide) and eject the document sheets onto the discharge table, and a reading unit that is disposed on the feeding path and is configured to read an image of a document sheet being fed on the feeding path.

The feeding path includes a first path (a first guide) configured to feed the document sheets in a first feeding direction from the document table, and a second path (a second guide) that extends continuously from the first path and turns around in a second feeding direction opposite to the first feeding direction so as to feed the document sheets toward the discharge table in the second feeding direction.

Thus, in the known document reader, a document sheet held on the document table is fed in the first feeding direction along the first path, thereafter is turned around in the second feeding direction opposite to the first feeding direction, and is fed in the second feeding direction along the second path. Then, the document sheet, after an image thereof is read by the reading unit in the course of the second path, is ejected onto the discharge table.

SUMMARY

In the meantime, in the known document reader (document feeder), since the discharge table is disposed below the document table with an overlap with the document table in the vertical direction, the feeding path is formed in a laterally-facing "U" shape. The second path is disposed below various parts that form the document table and the first path, and an upper side of the second path is covered with the various parts. Therefore, when a document sheet is jammed on the second path, a user is not allowed to access the second path from above due to the document table interrupting the access to the second path. In view of the problem, in the known document reader, the second path is allowed to be opened (exposed) by swinging down a swing portion provided under the second path. However, in the known document reader, even though the swing portion is swung down, the user needs to lift up an opening-closing unit that includes the document table, the discharge table, and the conveyor, and further needs to remove the jammed sheet while looking up at the second path from beneath. Consequently, it is difficult for the user to remove the document sheet jammed on the second path.

Aspects of the present invention are advantageous to provide one or more improved techniques, for document readers, which make it possible to easily remove a document sheet jammed on the second path (the second guide).

According to aspects of the present invention, a document reader is provided that includes a document table configured to hold document sheets to be read, a discharge table disposed below the document table with an overlap with the document table in a vertical direction, a conveyance guide configured to form a feeding path, the conveyance guide including a first guide formed to feed the document sheets held on the document table, in a first feeding direction, and a second guide formed to extend continuously from the first guide and turn around in a second feeding direction opposite to the first feeding direction so as to feed the document sheets toward the discharge table in the second feeding direction, a conveyor configured to convey the document sheets held on the document table, on a sheet-by-sheet basis along the conveyance guide, and eject the document sheets onto the discharge table, and a reading unit disposed on the second guide, the reading unit configured to read images of the document sheets being fed along the second guide, at least part of the document table configured to swing around a first axis, between a first position where the at least part of the document table functions as the document table and a second position where the at least part of the document table is more slanted with respect to the first guide than when in the first position, the document reader further including a swing portion configured to form a part of a feeding surface forming the second guide and configured to swing around a second axis, between a third position where the swing portion functions as the second guide, and a fourth position to expose a part of the feeding path that is formed by the second guide, and a switching mechanism configured to cause the swing portion to swing from the third position to the fourth position in conjunction with the swing motion of the at least part of the document table from the first position to the second position.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described in detail with reference to the accompanying drawings.

Embodiment

Figure 1:
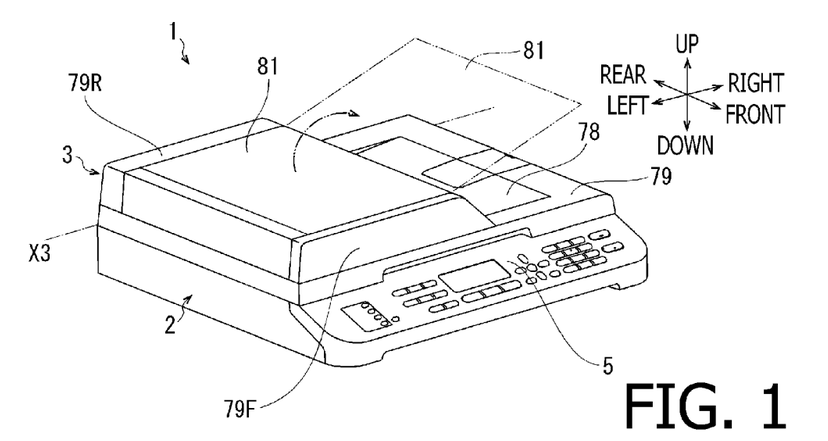
FIG. 1 is a perspective view schematically showing an external configuration of a document reader in an embodiment according to one or more aspects of the present invention.

FIG. 1 shows a document reader 1 of an embodiment according to aspects of the present invention. In the following description, a front side, a rear side, a left side, a right side, an upside, and a downside of the document reader 1 will be defined as indicated in FIG. 1.

<Configuration>

Figure 2:
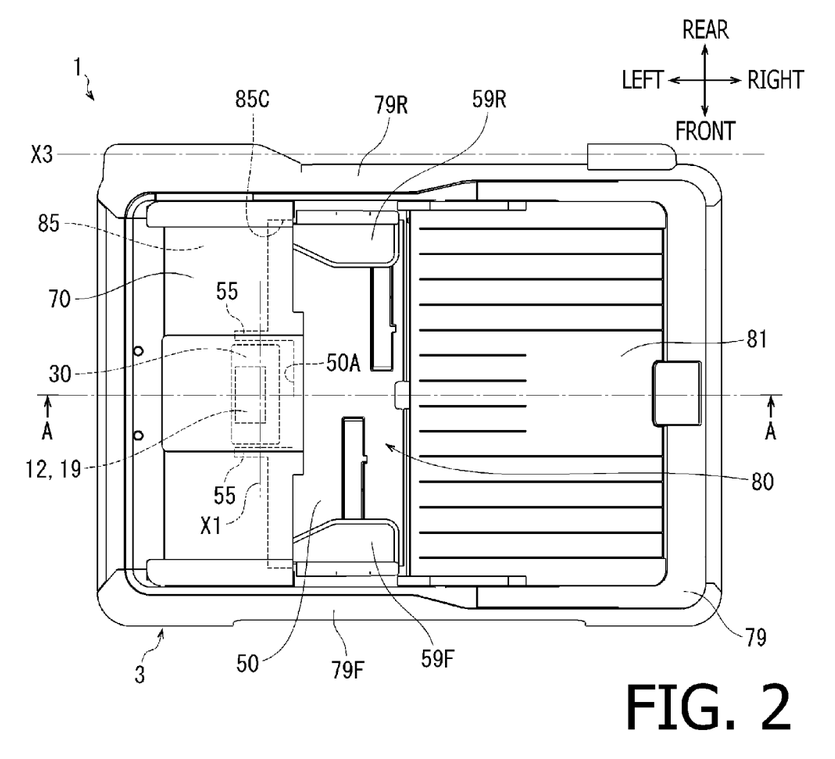
FIG. 2 is a top view of the document reader in a state where a feed tray is open in the embodiment according to one or more aspects of the present invention.
Figure 3:
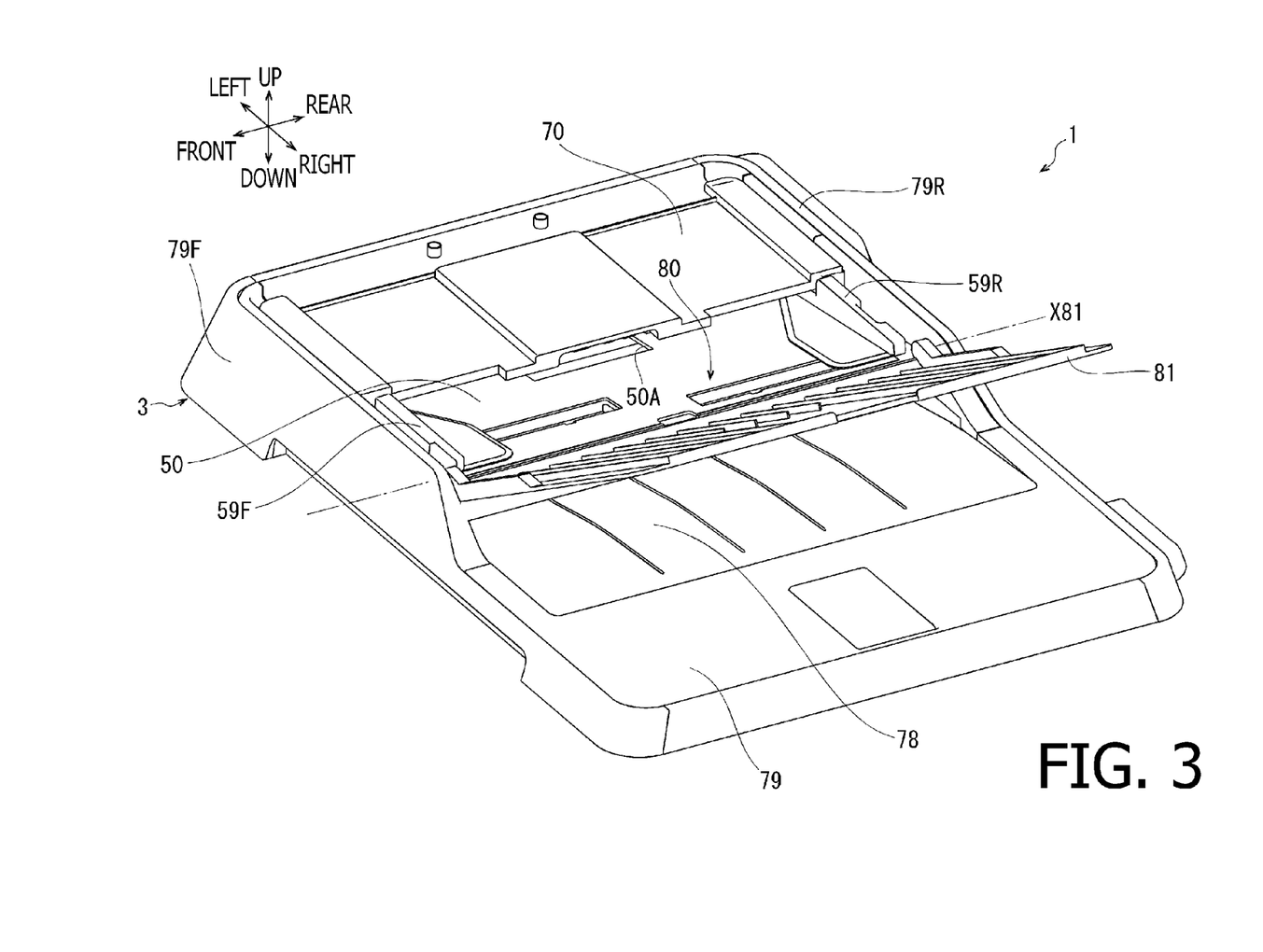
FIG. 3 is a perspective view of the document reader in the state where the feed tray is opened in the embodiment according to one or more aspects of the present invention.
Figure 4:
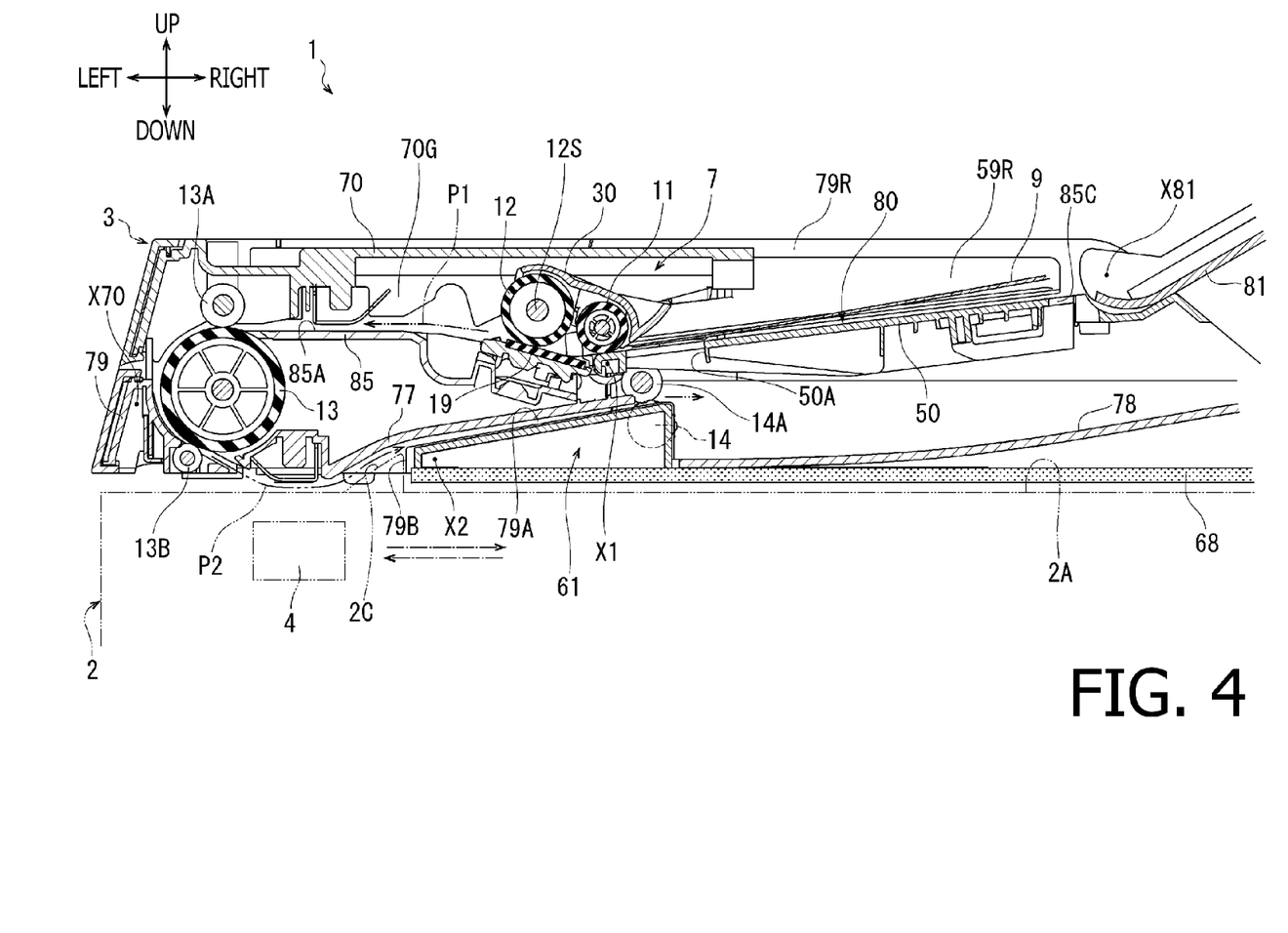
FIG. 4 is a cross-sectional view taken along a line A-A shown in FIG. 2 in the embodiment according to one or more aspects of the present invention.

As shown in FIGS. 1 to 4, the document reader 1 includes a main body unit 2 and an opening-closing unit 3. The main body unit 2 is formed substantially in a flattened box shape. The main body unit 2 includes an operation panel 5 (see FIG. 1) provided on the front side thereof. As shown in FIG. 4, an upper surface of the main body unit 2 includes a placement surface 2A for reading a document sheet statically placed thereon. As shown in FIGS. 1 and 2, the opening-closing unit 3 is supported by the main body unit 2 to be swingable around an opening-closing axis X3. In a closed state as shown in FIG. 1, the opening-closing unit 3 covers the placement surface 2A from above (see FIG. 4). Although the following situation is not shown in any drawings, when the front side of the opening-closing unit 3 is swung upward around the opening-closing axis X3, an upper side of the placement surface 2A is opened (exposed to the outside of the document reader 1). Thereby, the user is allowed to place a document sheet to be read, on the placement surface 2A.

As shown in FIG. 4, a reading unit 4 is provided inside the main body unit 2. As the reading unit 4, a known image reading sensor is employed such as a contact image sensor (CIS) and a charge coupled device (CCD). The document reader 1 is configured to read an image of the document sheet placed on the placement surface 2A while moving the reading unit 4 from a left side to a right side within the main body unit 2. Further, when statically staying in a predetermined position on the left side within the main body unit 2 as shown in FIG. 4, as will be described below, the reading unit 4 is allowed to read images of one or more document sheets that are automatically being fed from a document table 80 on a sheet-by-sheet basis. As will be described later, it is noted that the document table 80 is formed with a plane extending from an upward-facing surface of a feed tray 81 to a portion, close to a separation pad 19, of an upper surface of an upper chute 85 via an upper surface of a document holding member 50. Further, in the embodiment, a width direction of document sheets 9, which are held on the document table 80 and to be fed along a feeding path (a conveyance guide), is a front-to-rear direction.

Figure 5:
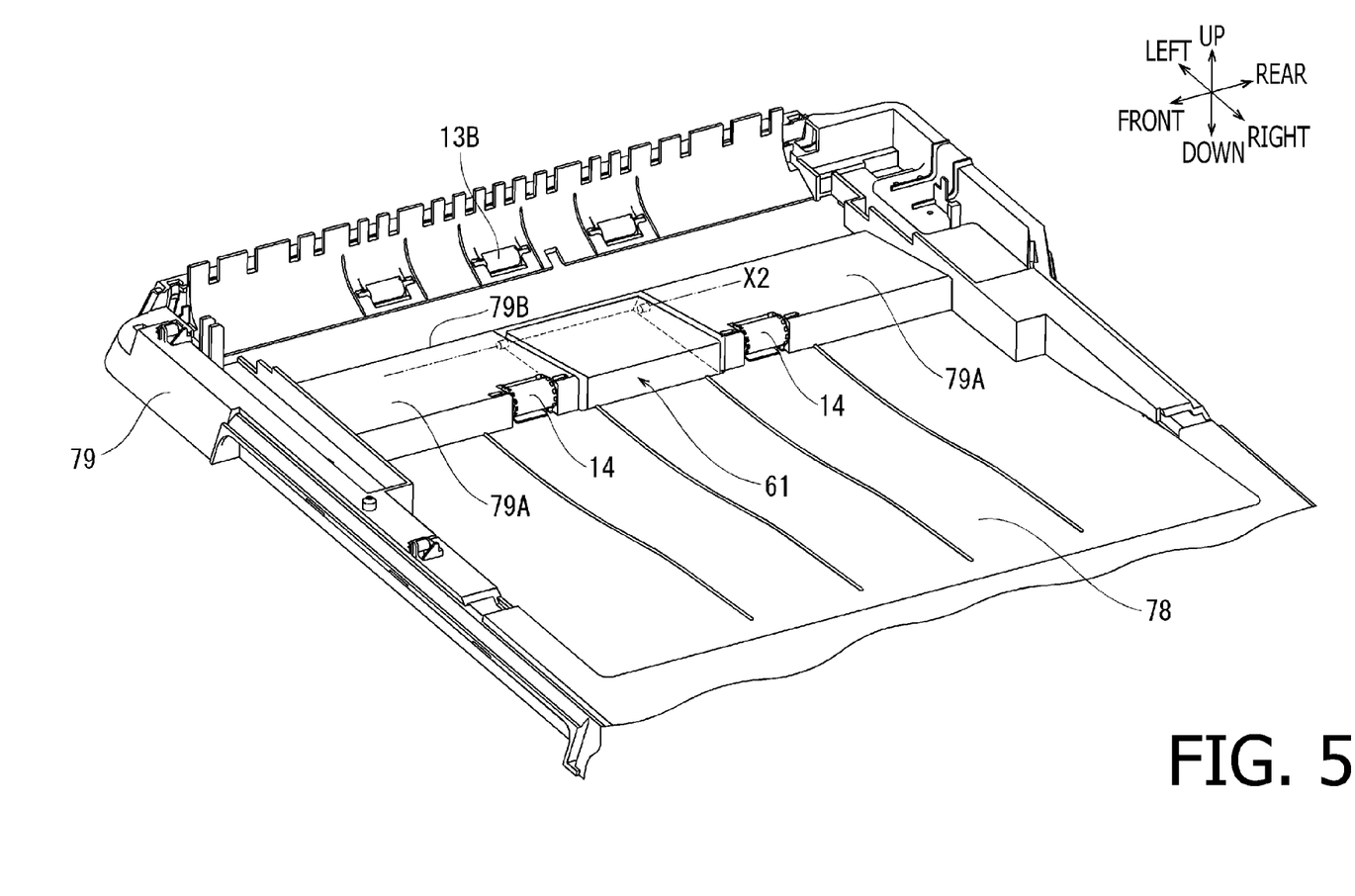
FIG. 5 is a partial perspective view showing a discharge table and a swing portion of the document reader in the embodiment according to one or more aspects of the present invention.

As shown in FIGS. 3 to 5, the opening-closing unit 3 includes a base member 79, a lower chute 77, an upper chute 85, the document holding member 50, a cover member 70, and the feed tray 81.

As shown in FIG. 4, the base member 79 is substantially a flat plate member configured to cover the placement surface 2A from above in a state where the opening-closing unit 3 is closed. As shown in FIGS. 4 and 5, a right portion of the base member 79 forms a discharge table 78 configured such that the document sheets 9 fed along a below-mentioned second path (a second guide) P2 are ejected and stacked thereon. A left upper-surface portion of the base member 79 forms a lower feeding surface 79A, which forms the below-mentioned second path P2. The lower feeding surface 79A extends upward in a slanted manner in a left-to-right direction.

As shown in FIG. 5, the feeding surface 79A of the base member 79 is hollowed to form a recess at a central region thereof in the front-to-rear direction, and a swing portion 61 is supported within the recess. Specifically, the swing portion 61 is located, relative to the base member 79, such that an upper surface of the swing portion 61 is substantially as high as the feeding surface 79A. Thereby, the upper surface of the swing portion 61, together with the feeding surface 79A, guides the document sheets 9 fed along the second path P2. The swing portion 61 is supported by the base member 79 so as to be swingable around a second axis X2 extending in the front-to-rear direction, between a position thereof shown in FIGS. 4 and 5 and a position thereof shown in FIGS. 7 and 8. The swing portion 61, when being in the position shown in FIGS. 4 and 5 (hereinafter referred to as the "third position"), serves as the below-mentioned second path P2. When the swing portion 61 is in the position shown in FIGS. 7 and 8 (hereinafter referred to as the "fourth position"), the second path P2 is opened (exposed to the outside of the document reader 1).

As shown in FIG. 5, the base member 79 includes an opening 79B formed in a position adjacent to a left end of the feeding surface 79A. The opening 79B is rectangular hole elongated in the front-to-rear direction. As shown in FIG. 4, in a state where the opening-closing unit 3 is closed to cover the placement surface 2A from above, the opening 79B is located above the reading unit 4 statically staying in the predetermined position.

A sponge sheet 68 is attached to a right portion, relative to the opening 79B, of a lower surface of the base member 79 including the feeding surface 79A. The sponge sheet 68 is wide enough to cover the placement surface 2A. Thereby, when the opening-closing unit 3 is closed to cover the placement surface 2A from above, the sponge sheet 68 is allowed to evenly press a whole area of a document sheet placed on the placement surface 2A, against the placement surface 2A.

As shown in FIGS. 2 and 3, there are two stand walls 79F and 79R provided on a left side of the base member 79. The two stand walls 79F and 79R are disposed to face each other, at a front side and a rear side of the base member 79, respectively. Further, each of the stand walls 79F and 79R extends upward in a screen (partition) shape.

The lower chute 77 is substantially a flat plate member configured to face, from above, the feeding surface 79A and the opening 79B of the base member 79 across a gap. A front side and a rear side of the lower chute 77 are attached to the stand walls 79F and 79R, respectively. The lower chute 77 is formed along the feeding surface 79A so as to cover an upper side of the opening 79B and form an upper feeding surface of the below-mentioned second path P2. Namely, a space between the base member 79 and the lower chute 77 serves as the second path P2. A projection 2C, which protrudes from the upper surface of the main body unit 2, comes into a lower portion of the lower chute 77 that does not face the feeding surface 79A. The document sheets 9 are fed between an upward-facing slanted surface of the projection 2C and the lower chute 77.

As shown in FIGS. 2 and 4, the upper chute 85 is located above the lower chute 77 and the discharge table 78. The upper chute 85 is substantially a flat plate member extending from substantially a center to near a left end of the opening-closing unit 3 in the left-to-right direction. A front side and a rear side of the upper chute 85 are attached to the stand walls 79F and 79R, respectively. An upper surface of a left portion of the upper chute 85 forms a lower feeding surface 85A of a below-mentioned first path (a first guide) P1. The upper chute 85 has a rectangular opening 85C (indicated by a dashed line in FIG. 2) elongated in the front-to-rear direction, formed at a right side thereof with a marginal portion thereof left. As shown in FIG. 4, a left portion, relative to the opening 85C, of the upper chute 85 forms the lower feeding surface 85A of the below-mentioned first path P1. As shown in FIGS. 2 and 4, a separation pad 19, which is a flat friction member, is disposed in such a position as to face a below-mentioned separation roller 12, near a center of the feeding surface 85A in the front-to-rear direction.

Figure 6:
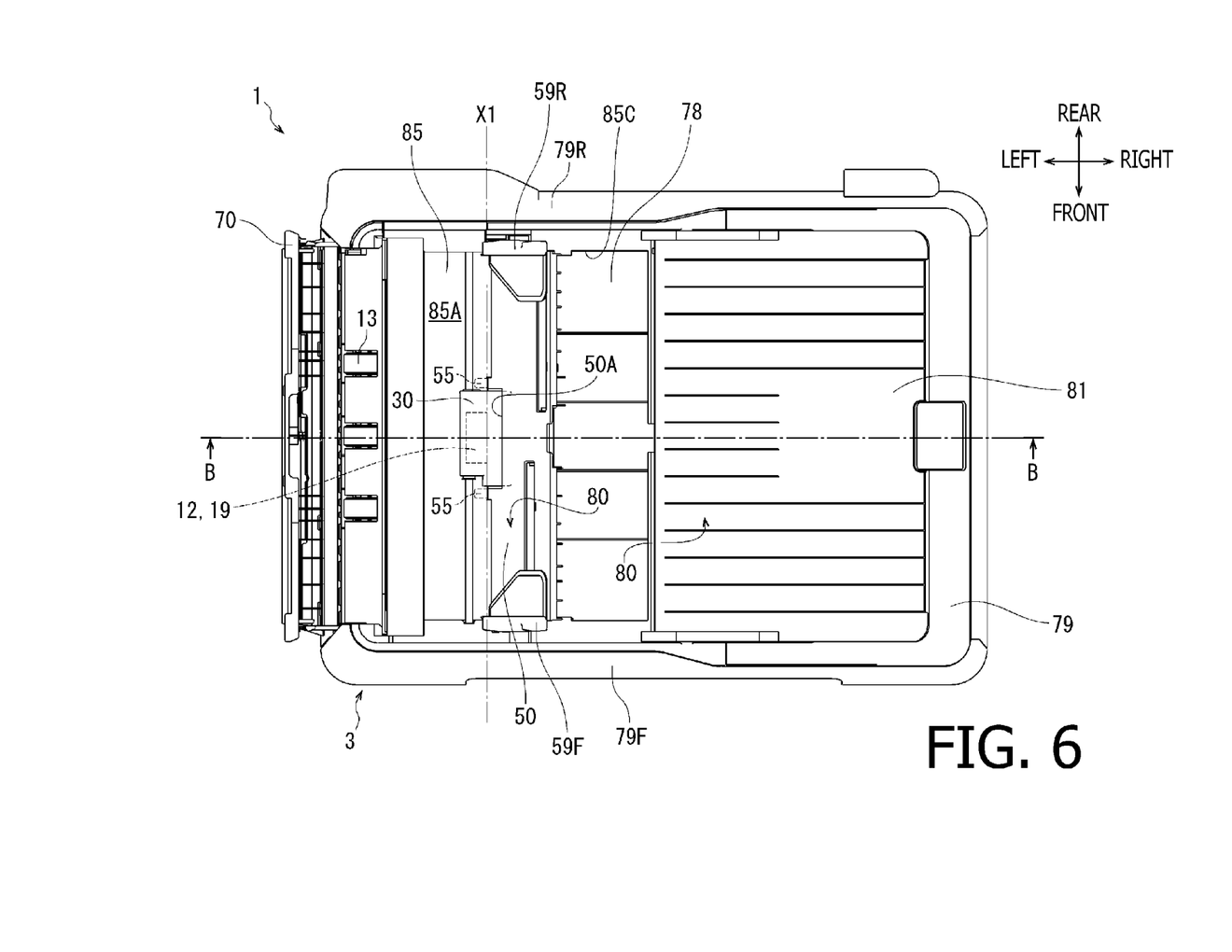
FIG. 6 is a top view of the document reader in a state where the feed tray and a cover member are opened, and a document holding member is swung from a first position to a second position in the embodiment according to one or more aspects of the present invention.
Figure 7:
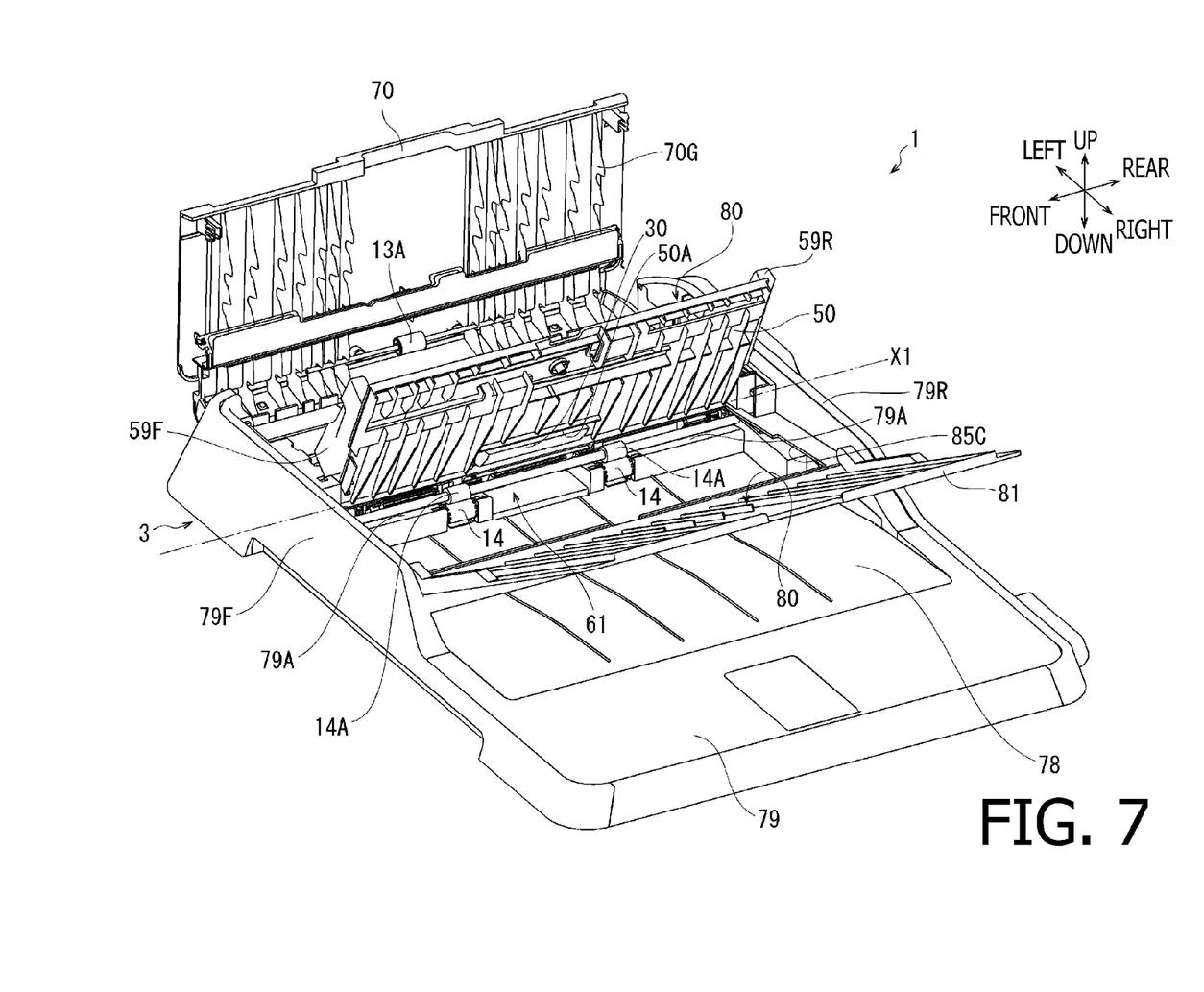
FIG. 7 is a perspective view of the document reader in the state where the feed tray and the cover member are opened, and the document holding member is swung from the first position to the second position in the embodiment according to one or more aspects of the present invention.
Figure 8:
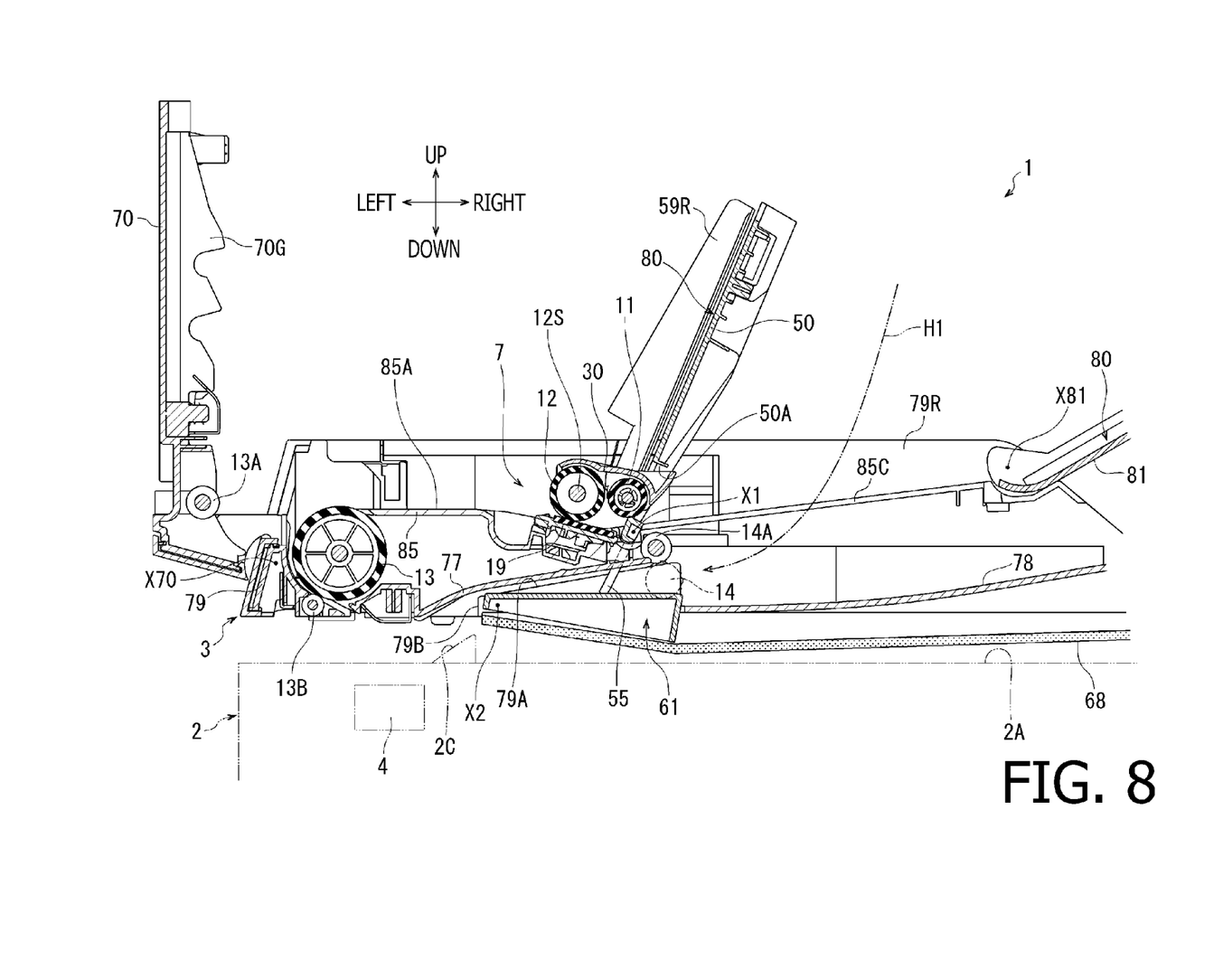
FIG. 8 is a cross-sectional view taken along a line B-B shown in FIG. 6 in the embodiment according to one or more aspects of the present invention.

As shown in FIGS. 2 and 4, the document holding member 50, which is housed within the rectangular opening 85C of the upper chute 85, is substantially a flat plate member that forms a plane continuous with the upper surface of the upper chute 85. The document holding member 50 is supported by the upper chute 85 so as to be swingable around a first axis X1 extending in the front-to-rear direction, between a first position shown in FIGS. 2 to 4 and a second position shown in FIGS. 6 to 8. The document holding member 50, when being in the first position shown in FIGS. 2 to 4, serves as the below-mentioned document table 80. The document holding member 50, when in the second position shown in FIGS. 6 to 8, is more slanted relative to the below-mentioned first path P1 than when in the position shown in FIGS. 2 to 4, so as to expose the upper side of the below-mentioned second path P2.

When the document holding member 50 is in the first position shown in FIGS. 2 to 4, an outer circumferential edge thereof is supported from underneath by an inner circumferential edge of the opening 85C. Thereby, the swing motion of the document holding member 50 is stopped, and the position thereof is held. When at least a right end, opposite to the first axis X1, of the document holding member 50 is supported from underneath by the upper chute 85, it is possible to hold on the position of the document holding member 50.

As shown in FIGS. 2 and 4, in a center of a left end of the document holding member 50 in the front-to-rear direction, an escape portion 50A is formed to be cut out rightward in a rectangular shape. The escape portion 50A is cut out up to a right side relative to a below-mentioned holder 30. Thereby, even when the document holding member 50 swings to the second position shown in FIGS. 6 to 8, it is possible to prevent the document holding member 50 from contacting the holder 30 or the separation pad 19 owing to the escape portion 50A.

On the upper surface of the document holding member 50, two document guides 59F and 59R are provided that extend upward in a screen (partition) shape and face each other in the front-to-rear direction. The two document guides 59F and 59R are connected with each other via a rack-and-pinion mechanism (not shown) provided on a side of a back surface of the document holding member 50, so as to get close to or away from each other while sliding on the document holding member 50. Thereby, the two document guides 59F and 59R are allowed to position the document sheets 9 held on the document table 80 in the width direction of the document sheets 9, i.e., in the front-to-rear direction. The two document guides 59F and 59R are configured to move together with the document holding member 50 moving between the first position and the second position.

As shown in FIG. 2, the document holding member 50 is provided integrally with a switching mechanism 55. The switching mechanism 55 is configured with two pressing projections that protrude leftward from the left end of the document holding member 50 across the first axis X1. In FIG. 4, the two projections of the switching mechanism 55 are disposed at a near side and a far side with respect to the sheet of FIG. 4, respectively, to be spaced apart from each other across the separation pad 19 above the swing portion 61. The switching mechanism 55 is configured to swing downward around the first axis X1, integrally with the document holding member 50 swinging from the first position to the second position. At this time, as shown in FIG. 8, the switching mechanism 55 contacts the upper surface of the swing portion 61 and pushes the swing portion 61 downward to the fourth position shown in FIGS. 7 and 8.

As shown in FIG. 4, the cover member 70 is substantially a flat plate member extending from substantially the center to the left end of the opening-closing unit 3 in the left-to-right direction, in a state disposed above and spaced apart from the upper chute 85 and the document holding member 50. A left side of the cover member 70 is bent downward, and a lower end thereof is supported by the upper chute 85 so as to be swingable around an opening-closing axis X70. Thereby, the cover member 70 is movable between a closed position shown in FIGS. 2 to 4 and an open position shown in FIGS. 6 to 8.

As shown in FIG. 7, an inner surface of the cover member 70 includes a plurality of ribs 70G formed each of which extends in the left-to-right direction. The plurality of ribs 70G are arranged along the front-to-rear direction. As shown in FIG. 4, when the cover member 70 is in the closed position, each rib 70G faces, from above, the upper chute 85 and the document holding member 50, and forms an upper feeding surface of the below-mentioned path P1.

As indicated by a solid line in FIG. 1, the feed tray 81 is, when not in use, substantially a flat plate member extending from substantially the center to near the left end of the opening-closing unit 3 in the left-to-right direction, in a state overlapping, from above, the cover member 70 in the closed position. As shown in FIG. 3, the feed tray 81 is supported by the upper chute 85 in such a manner that a left end of the feed tray 81 is swingable around an opening-closing axis X81.

When the feed tray 81 is used, as indicated by a long dashed double-short dashed line in FIG. 1, the feed tray 81 is swung around the opening-closing axis X8 to be farther away from the cover member 70. Thereby, as shown in FIGS. 3 and 4, an upward-facing surface of the feed tray 81 forms a plane continuous with the upper surface of the upper chute 85 and the upper surface of the document holding member 50. The plane, which extends from the upward-facing surface of the feed tray 81 to a portion, close to the separation pad 19, of the upper surface of the upper chute 85 via the upper surface of a document holding member 50, serves as the document table 80 configured to receive placement of the document sheets 9 to be read. Further, in this state, the discharge table 78 is located below the document table 80, with an overlap with the document table 80 in a vertical direction.

As shown in FIG. 4, a conveyor 7 is provided inside the opening-closing unit 3. The conveyor 7 is configured to convey the document sheets 9 held on the document table 80, on a sheet-by-sheet basis along the feeding path, and to eject the document sheets 9 onto the discharge table 78. It is noted that the feeding path includes the first path P1 and the second path P2.

The first path P1 is configured to feed the document sheets 9 in a direction from right to left along the feeding surface 85A of the upper chute 85 and the ribs 70G of the cover member 70.

The second path P2 extends, continuously from the first path P1, downward in a U-turn manner, and turns around in a direction from left to right, so as to feed the document sheets 9 toward the discharge table 78 along the feeding surface 79A of the base member 79 and the lower chute 77.

The reading unit 4, statistically resting in the predetermined position, is disposed in such a position on the second path P2 as to face the opening 79B. Thereby, a downward-facing side of each document sheet 9 being fed on the second path P2 faces and passes over the reading unit 4 statistically resting in the predetermined position.

As shown in FIGS. 4 and 5, the conveyor 7 includes a rotational shaft 12S, the separation pad 19, the holder 30, a pickup roller 11, a feed roller 13, discharge rollers 14, and driven rollers 13A, 13B, and 14A.

As shown in FIG. 4, the rotational shaft 12S is disposed in a higher position than the feeding surface 85A of the upper chute 85, and is a cylindrical shaft body extending in the front-to-rear direction. The rotational shaft 12S is disposed downstream relative to the first axis X1 in a first feeding direction on the first path P1. A front end and a rear end of the rotational shaft 12S are rotatably supported by the lower chute 77. When the document sheets 9 held on the document table 80 are fed along the feeding path, the rotational shaft 12S is driven by a driving unit (not shown) to rotate clockwise in FIG. 4.

The separation roller 12 is fixed to a center of the rotational shaft 12S in the front-to-rear direction. Thereby, the separation roller 12 rotates integrally with the rotational shaft 12S.

The separation roller 12 faces, from above, the separation pad 19 provided on the upper chute 85. The separation pad 19 is pressed against the separation roller 12 by a pressing spring (not shown) provided between the separation pad 19 and the upper chute 85.

The holder 30 is swingably supported by the rotational shaft 12S, in a state pinching the separation roller 12 in the front-to-rear direction. The holder 30 extends rightward (toward a side close to the document table 80) from the rotational shaft 12S.

The pickup roller 11 is disposed at a right side relative to the separation roller 12, and is supported by the holder 30 to be rotatable around a rotational axis parallel to the rotational shaft 12S. The holder 30 is provided with a transmission mechanism (not shown). The transmission mechanism includes two gears configured to rotate integrally with the separation roller 12 and the pickup roller 11, respectively, and an intermediate gear configured to engage with the two gears. The transmission mechanism causes the pickup roller 11 and the separation roller 12 to rotate in synchronization with each other.

The holder 30 swings around the rotational shaft 12S depending on the number of the document sheets 9 held on the document table 80 so as to change a distance between the pickup roller 11 and the document table 80. Therefore, the pickup roller 11 contacts a top one of the document sheets 9 held on the document table 80, regardless of the number of the document sheets 9.

The feed roller 13 is a large-diameter roller disposed at a left end of the upper chute 85. The feed roller 13 is located on a right side relative to the most upstream portion of the second path P2 that runs downward in a U-turn manner. The feed roller 13 rotates in synchronization with the pickup roller 11 and the separation roller 12. The driven roller 13A is disposed substantially immediately above the feed roller 13, and is pressed against the feed roller 13 by an urging member (not shown). Around the driven roller 13A, the feeding direction of the document sheets 9 is switched from the first feeding direction to a second feeding direction, and the first path P1 is connected with the second path P2. The driven roller 13B is disposed at a diagonally lower left side relative to the feeding roller 13, and is pressed against the feeding roller 13.

As shown in FIGS. 4 and 5, the discharge rollers 14 are disposed at a left side of the discharge table 78 of the base member 79. The discharge rollers 14 are two rollers arranged in the width direction of the document sheets 9 to be fed, that is, in the front-to-rear direction. The aforementioned swing portion 61 is disposed between the mutually adjacent two discharge rollers 14. The discharge rollers 14 rotate in synchronization with the pickup roller 11, the separation roller 12, and the feed roller 13, at the most downstream side of the second path P2. The driven roller 14A is pressed against the discharge rollers 14 from above, at the most downstream side of the second path P2.

<Automatic Reading of Document Sheets on Document Table>

The document reader 1 configured as above automatically feeds the document sheets 9 held on the document table 80 and reads images of the document sheets 9 in accordance with the following procedure.

Firstly, as shown in FIG. 4, the user places the document sheets 9 on the document table 80, and pushes the document sheets 9 in such a manner that the leading ends thereof are inserted beneath the feed roller 11. Next, when the user operates the operation panel 5, the document reader 1 begins an automatic reading operation. Then, the driving unit (not shown) is driven to rotate the rotational shaft 12S, the separation roller 12, and the pickup roller 11. Thereby, the pickup roller 11 feeds the document sheets 9 on the document table 80 toward the first path P1. The document sheets 9 fed by the pickup roller 11 pass through between the separation roller 12 and the separation pad 19. At this time, when two or more document sheets 9 are concurrently fed in a multi-feed manner by the pickup roller 11, the two or more document sheets 9 are separated on a sheet-by-sheet basis by a feeding force from the separation roller 12 and a frictional force from the separation pad 19.

Further, the feed roller 13 and the discharge rollers 14 rotate in synchronization with the rotational shaft 12S. The feed roller 13 feeds each document sheet 9, separated on a sheet-by-sheet basis by the separation roller 12, downward in a U-turn manner to let each document sheet 9 pass over the reading unit 4 statically staying in the predetermined position. Thereby, the reading unit 4 reads the images of the document sheets 9. Then, the document sheets 9 of which the images have been read are ejected onto the discharge table 78 by the discharge rollers 14. These operations are repeatedly performed until the document sheets 9 are completely fed and disappear from the document table 80.

<How to Deal with Document Sheet Jammed on Feeding Path>

In the document reader 1 of the embodiment, when a document sheet 9 is jammed on the first path P1, as shown in FIGS. 7 and 8, by opening the cover member 70, it is possible to expose upper sides of the holder 30, the pickup roller 11, and the separation roller 12. Thereby, the user is allowed to access (hold out a hand to) the first path P1 from above and remove the jammed document sheet 9.

Further, in the document reader 1, when a document sheet 9 is jammed on the second path P2, it is possible to remove the jammed document sheet 9 in the following procedure. That is, as shown in FIGS. 7 and 8, by a user's operation to hold and lift a right end of the document holding member 50, the document holding member 50 that forms a part of the document table 80 is swung around the first axis X1 from the first position to the second position. The document holding member 50 swung to the second position is more slanted with respect to the first path P1 than when in the first position, so as to expose an upper side of a downstream portion of the second path P2 in the second feeding direction. At that time, the switching mechanism 55 (the projections provided integrally with the document holding member 50) moves downward in conjunction with the movement of the document holding member 50 from the first position to the second position. Thereby, the switching mechanism 55 contacts and presses down the upper surface of the swing portion 61. Therefore, the swing portion 61 swings around the second axis X2 from the third position to the fourth position. Thus, only by swinging the document holding member 50 from the first position to the second position by the simple switching mechanism 55, it is possible to easily swing the swing portion 61 to the fourth position. Thereby, as shown in FIGS. 7 and 8, the swing portion 61 is swung from the third position to the fourth position and the second path P2 is opened (exposed to the outside of the document reader 1).

Consequently, in the document reader 1, it is possible to secure a space formed by moving the document holding member 50 to the second position, that is, a vacant space that allows access to the opened second path P2 from above without being interrupted by the document table 80. Thereby, in the document reader 1, as indicated by a long dashed double-short dashed line in FIG. 8, the user is allowed to visually recognize the document sheet 9 jammed on the second path P2 through the vacant space, and easily access (hold out a hand to) the document sheet 9 jammed on the second path P2 from above the second path P2 through the vacant space. Further, the user needs not lift up the opening-closing unit 3 or remove the jammed document sheet 9 while looking up at the second path P2 from beneath as required to be performed in the known document reader.

Accordingly, in the document reader 1 of the embodiment, it is possible to easily remove the document sheet 9 jammed on the second path P2 before being ejected.

Further, in the document reader 1, when the document holding member 50 swings from the first position to the second position, various elements associated with the two document guides 59F and 59R such as the rack-and-pinion mechanism concurrently swing. Therefore, in the document reader 1, it is possible to utilize existing components as various elements associated with the two document guides 59F and 59R and to prevent complicated components.

Further, in the document reader 1, as shown in FIG. 8, when the swing portion 61 swings from the third position to the fourth position, a right end of the swing portion 61 protrudes downward from the lower surface of the base member 79. Thereby, a portion, pressed by the right end of the swing portion 61, of the sponge sheet 68 bulges downward. Then, when the user pushes down the document holding member 50 after removing the document sheet 9 jammed on the second path P2, the document holding member 50 returns to the first position from the second position. Thereby, the switching mechanism 55 (the projections provided integrally with the document holding member 50) moves upward to be farther away from the upper surface of the swing portion 61 in conjunction with the document holding member 50 returning to the first position from the second position. At this time, as shown in FIG. 4, by a restoring force of the sponge sheet 68, the downward-bulging portion of the sponge sheet 68 is restored into a flat state so as to push up the right end of the swing portion 61. Thus, the swing portion 61 is allowed to certainly return to the third position from the fourth position.

Further, according to the document reader 1, the swing portion 61 is disposed between the mutually adjacent discharge rollers 14. Hence, it is possible to swing the swing portion 61 without having to move the discharge rollers 14. Therefore, the document reader 1 makes it possible to more effectively prevent an undesirably lowered nipping pressure of the discharge rollers 14 than another document reader 1 configured such that discharge rollers 14 moves along with a swing motion of a swing portion 61.

Further, in the document reader 1, the second axis X2 is located between the reading unit 4 and the first axis X1 in the left-to-right direction. In other words, the second axis X2 is located downstream relative to the reading unit 4 in the second feeding direction (i.e., the direction from left to right) and upstream relative to the first axis X1 in the second feeding direction. According to the configuration, it is possible to achieve large displacement of the right end of the swing portion 61. Hence, it is possible to widely open the side of the second path P2 close to the discharge table 78. Thus, it is possible to secure a large vacant space that allows access to the opened second path P2 from above, and to easily remove the document sheet 9 jammed on the second path P2.

Further, in the document reader 1, the document holding member 50 includes the escape portion 50A, and the first axis X1 is located below the separation roller 12 and the separation pad 19. Therefore, as shown in FIG. 8, even though the document holding member 50 swings to the second position, the escape portion 50A makes it possible to avoid interference (contact) between the document holding member 50 and the elements such as the holder 30, the separation roller 12, and the separation pad 19. Thus, it is possible to swing the document holding member 50 to the second position and remove the document sheet 9 jammed on the second path P2 with maintenance of the configurations of the existing separation roller 12 and separation pad 19.

Further, in the document reader 1, the first axis X1 is located below the separation roller 12 and the separation pad 19, and the document holding member 50 is provided integrally with the switching mechanism 55 (the projections). Thus, it is possible to certainly swing the swing portion 61 from the third position to the fourth position with achievement of a small trajectory of the switching mechanism 55 moving downward.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations about the same configurations as exemplified in the aforementioned embodiment will be omitted.

(First Modification)

Figure 9:
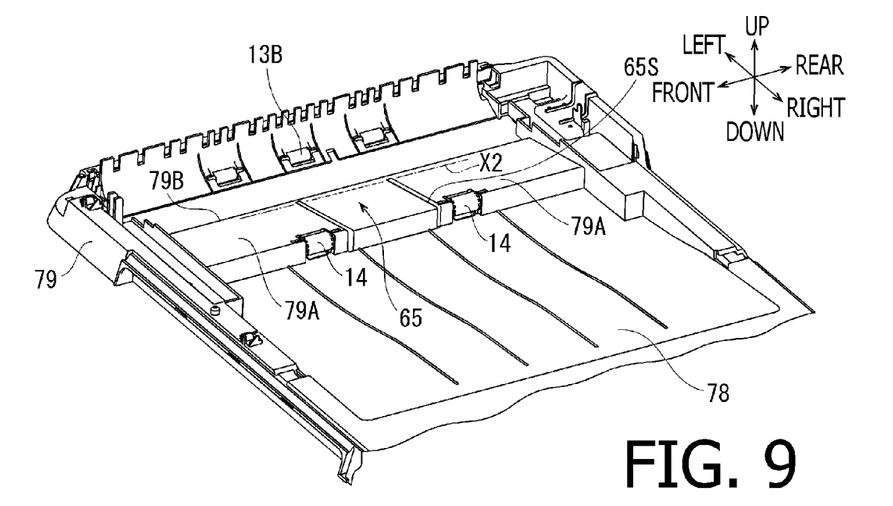
FIG. 9 is a partial perspective view showing a discharge table and a swing portion, which is in a third position, of a document reader in a first modification according to one or more aspects of the present invention.
Figure 10:
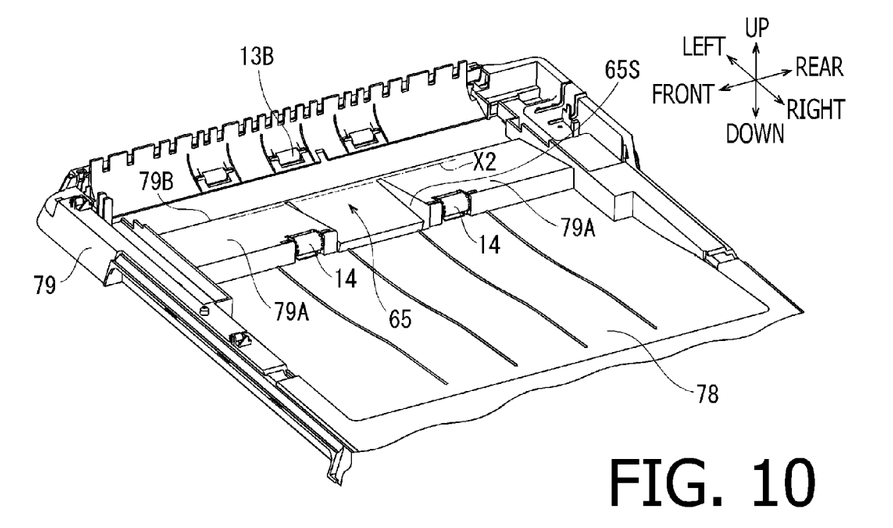
FIG. 10 is a partial perspective view showing the discharge table and the swing portion, which is in a fourth position, of the document reader in the first modification according to one or more aspects of the present invention.

In the aforementioned embodiment, the swing portion 61 is provided separately from the feeding surface 79A and the discharge table 78. However, as shown in FIGS. 9 and 10, a swing portion 65 integrated with the feeding surface 79A and the discharge table 78 may be provided. In this case, each of the feeding surface 79A, the discharge table 78, and the swing portion 65 may be a part of the base member 79. Instead of supporting the swing portion 61, the base member 79 may include a slit 65S formed in a center of the feeding surface 79A continuous in the front-to-right direction. The slit 65S may be formed substantially in a rectangular "U" shape that is open to the side of the opening 79B. In this case, a divisional portion separated from the feeding surface 79A by the slit 65S forms the swing portion 65. The swing portion 65 may be configured to swing around the second axis X2 from the third position shown in FIG. 9 to the fourth position shown in FIG. 10 while elastically deforming relative to the feeding surface 79A and the discharge table 78. According to such a configuration, the feeding surface 79A, the discharge table 78, and the swing portion 65 are integrated as a single member. Further, the configuration employing the slit 65S does not require any shaft or bearing. Thus, it is possible to reduce the number of components and achieve a lowered cost for manufacturing the document reader 1.

(Second Modification)

Figure 11:
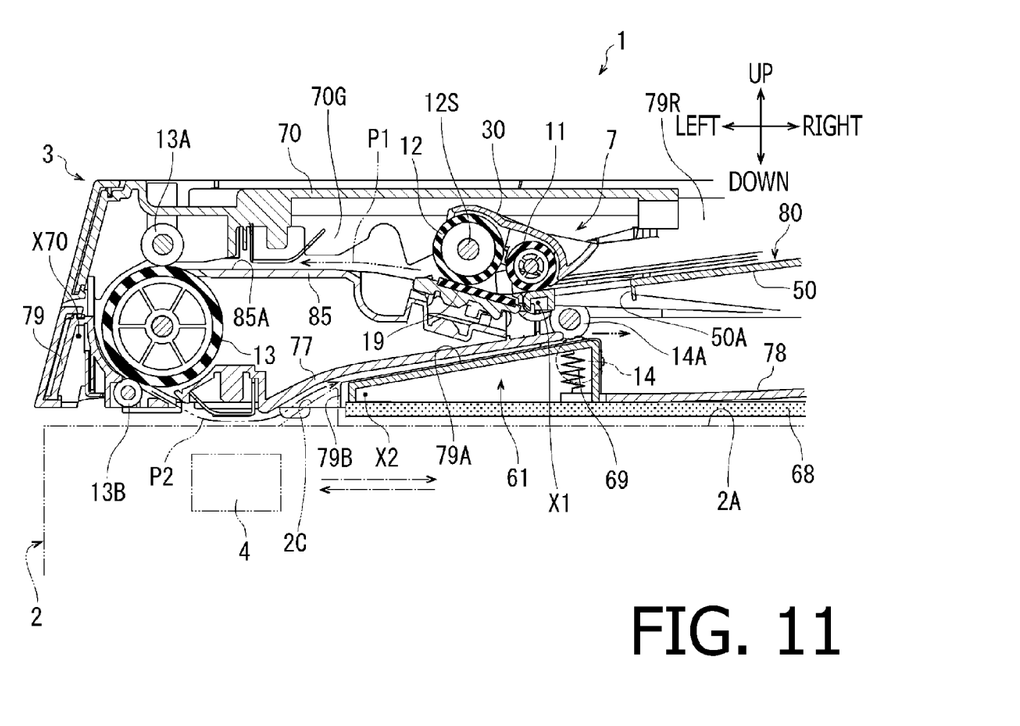
FIG. 11 is a cross-sectional view of a document reader, taken along the same line as the line A-A shown in FIG. 2, in a second modification according to one or more aspects of the present invention.

As shown in FIG. 11, a spring 69 may be provided to the document reader 1. The spring 69 may be a compression coil spring. One end of the spring 69 may be supported by a portion of the base member 79 that extends leftward from the discharge table 78 and corresponds to the swing portion 61. The other end of the spring 69 may contact the lower surface of the swing portion 61 and urge the swing portion 61 upward. Although the following situation is not shown in any drawings, when the swing portion 61 is pressed down by the switching mechanism 55 and swung to the fourth position, the spring 69 is compressed to store restoring energy. Meanwhile, when the swing portion 61 is not pressed down by the switching mechanism 55, the swing portion 61 is pushed up by the stored restoring energy (force). Therefore, the swing portion 61 is caused to certainly return to the third position. Further, when the spring 69 is configured to exert a great urging force, since the sponge sheet 68 needs not necessarily apply a pressing force to a document sheets placed on the placement surface 2A, the sponge sheet 68 may be made of softer material. In this case, it is possible to restrain the durability of the sponge sheet 68 from being quickly deteriorated.

Moreover, for instance, the switching mechanism 55 may be configured with a linkage mechanism, cables, gears, or pulleys, instead of the projections as exemplified in the aforementioned embodiment.

The invention claimed is:

1. A document reader comprising:
   a document table configured to support one or more document sheets placed thereon; and
   a discharge tray disposed below the document table and overlapping the document table in a vertical direction;
   a conveyor configured to convey the one or more document sheets placed on the document table, on a sheet-by-sheet basis along a conveyance path, and discharge the one or more document sheets onto the discharge tray; and
   a reading unit configured to read images of the one or more document sheets being conveyed by the conveyor,
   wherein the document table comprises:
     a first document supporter configured to swing around a first axis, between:
       a first position where the first document supporter supports at least a part of the one or more document sheets placed on the document table; and
       a second position to expose the discharge tray; and
     a second document supporter disposed upstream relative to the first document supporter in a conveyance direction in which the one or more document sheets are conveyed, and
   wherein the second document supporter is configured to rotate around a second axis, between:
     a closed position where the second document supporter covers the first document supporter in the first position from above; and
     an open position where the second document supporter is disposed adjacent to the first document supporter and forms the document table together with the first document supporter.

2. The document reader according to claim 1, wherein the first document supporter comprises a guide configured to regulate positions of end portions of the one or more document sheets in a width direction perpendicular to the conveyance direction.

3. The document reader according to claim 1,
   wherein the first axis extends in a direction perpendicular to the conveyance direction and is disposed at a downstream end portion of the first document supporter in the conveyance direction, and
   wherein the first document supporter is configured such that an upstream end portion of the first document supporter in the conveyance direction moves when the first document supporter swings around the first axis.

4. The document reader according to claim 1, wherein the second axis is parallel to and positioned above the first axis.

5. The document reader according to claim 1,
   wherein the conveyor comprises a separator configured to separate the one or more document sheets placed on the document table, on a sheet-by-sheet basis, and
   wherein the second document supporter is disposed in such a position as not to contact the separator.

* * * * *